US010316746B2

(12) United States Patent
Allen et al.

(10) Patent No.: US 10,316,746 B2
(45) Date of Patent: Jun. 11, 2019

(54) TURBINE SYSTEM WITH EXHAUST GAS RECIRCULATION, SEPARATION AND EXTRACTION

(71) Applicants: General Electric Company, Schenectady, NY (US); ExxonMobil Upstream Research Company, Spring, TX (US)

(72) Inventors: Jonathan Kay Allen, Simpsonville, SC (US); Bradford David Borchert, Bellingham, WA (US); Jesse Edwin Trout, Simpsonville, SC (US); Ilya Aleksandrovich Slobodyanskiy, Simpsonville, SC (US); Almaz Valeev, Moscow (RU); Igor Petrovich Sidko, Moscow (RU); Matthew Eugene Roberts, Mauldin, SC (US); Leonid Yul'evich Ginesin, Moscow (RU)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 556 days.

(21) Appl. No.: 15/014,981

(22) Filed: Feb. 3, 2016

(65) Prior Publication Data

US 2016/0222884 A1 Aug. 4, 2016

Related U.S. Application Data

(60) Provisional application No. 62/112,123, filed on Feb. 4, 2015.

(51) Int. Cl.

*F02C 3/34* (2006.01)
*F23C 9/00* (2006.01)

(Continued)

(52) U.S. Cl.

CPC ................ *F02C 3/34* (2013.01); *F01D 9/023* (2013.01); *F23C 9/08* (2013.01); *F23R 3/005* (2013.01);

(Continued)

(58) Field of Classification Search

CPC .... F02C 3/34; F23C 9/00; F23R 3/005; F23R 3/002; F23R 3/04; F23R 3/16; F23R 3/26

See application file for complete search history.

(56) References Cited

U.S. PATENT DOCUMENTS 2,488,911 A 11/1949 Hepburn et al.
2,884,758 A 5/1959 Oberle (Continued)

FOREIGN PATENT DOCUMENTS

CA 2231749 9/1998
CA 2645450 9/2007

(Continued)

OTHER PUBLICATIONS

PCT International Search Report and Written Opinion; Application No. PCT/US2016/016632; dated May 10, 2016; 13 pages.

(Continued)

*Primary Examiner* — Todd E Manahan
*Assistant Examiner* — Eric W Linderman
(74) *Attorney, Agent, or Firm* — Fletcher Yoder P.C.

(57) ABSTRACT

A system includes a turbine combustor having a first volume configured to receive a combustion fluid and to direct the combustion fluid into a combustion chamber. The turbine combustor includes a second volume configured to receive a first flow of an exhaust gas and to direct the first flow of the exhaust gas into the combustion chamber. The turbine combustor also includes a third volume disposed axially downstream from the first volume and circumferentially about the second volume. The third volume is configured to (Continued)

receive a second flow of the exhaust gas and to direct the second flow of the exhaust gas out of the turbine combustor via an extraction outlet, and the third volume is isolated from the first volume and from the second volume.

22 Claims, 4 Drawing Sheets

(51) Int. Cl.
*F23R 3/00* (2006.01)
*F23R 3/06* (2006.01)
*F23R 3/04* (2006.01)
*F23R 3/26* (2006.01)
*F23C 9/08* (2006.01)
*F01D 9/02* (2006.01)
*F23R 3/16* (2006.01)
*F23R 3/28* (2006.01)

(52) U.S. Cl.
CPC .................. *F23R 3/04* (2013.01); *F23R 3/26* (2013.01); *F05D 2260/61* (2013.01); *F23C 9/00* (2013.01); *F23C 2202/50* (2013.01); *F23C 2900/09001* (2013.01); *F23R 3/002* (2013.01); *F23R 3/16* (2013.01); *F23R 3/28* (2013.01); *F23R 2900/03043* (2013.01); *Y02T 50/675* (2013.01)

(56) References Cited

U.S. PATENT DOCUMENTS 2,906,092 A * 9/1959 Haltenberger ............ F02C 3/34 60/39.52
3,631,672 A 1/1972 Gentile et al.
3,643,430 A 2/1972 Emory et al.
3,705,492 A 12/1972 Vickers
3,841,382 A 10/1974 Gravis et al.
3,949,548 A 4/1976 Lockwood
4,018,046 A 4/1977 Hurley
4,043,395 A 8/1977 Every et al.
4,050,239 A * 9/1977 Kappler .................... F02C 7/08 60/39.511
4,066,214 A 1/1978 Johnson
4,077,206 A 3/1978 Ayyagari
4,085,578 A 4/1978 Kydd
4,092,095 A 5/1978 Straitz
4,101,294 A 7/1978 Kimura
4,112,676 A 9/1978 DeCorso
4,117,671 A 10/1978 Neal et al.
4,160,526 A * 7/1979 Flanagan .................. F23C 9/00 239/427
4,160,640 A 7/1979 Maev et al.
4,164,124 A * 8/1979 Taylor ....................... F02C 3/26 241/40
4,165,609 A 8/1979 Rudolph
4,171,349 A 10/1979 Cucuiat et al.
4,204,401 A 5/1980 Earnest
4,222,240 A 9/1980 Castellano
4,224,991 A 9/1980 Sowa et al.
4,236,378 A 12/1980 Vogt
4,253,301 A 3/1981 Vogt
4,271,664 A * 6/1981 Earnest ................... F01K 23/10 60/39.181
4,344,486 A 8/1982 Parrish
4,345,426 A 8/1982 Egnell et al.
4,352,269 A 10/1982 Dineen
4,373,325 A * 2/1983 Shekleton ............. F02C 7/2365 60/737
4,380,895 A 4/1983 Adkins
4,399,652 A 8/1983 Cole et al.
4,414,334 A 11/1983 Hitzman
4,427,362 A * 1/1984 Dykema ................. F23C 6/045 110/345
4,434,613 A 3/1984 Stahl
4,435,153 A 3/1984 Hashimoto et al.
4,442,665 A 4/1984 Fick et al.
4,445,842 A 5/1984 Syska
4,479,484 A 10/1984 Davis
4,480,985 A 11/1984 Davis
4,488,865 A 12/1984 Davis
4,498,288 A 2/1985 Vogt
4,498,289 A 2/1985 Osgerby
4,528,811 A 7/1985 Stahl
4,543,784 A 10/1985 Kirker
4,548,034 A 10/1985 Maguire
4,561,245 A 12/1985 Ball
4,569,310 A 2/1986 Davis
4,577,462 A 3/1986 Robertson
4,602,614 A 7/1986 Percival et al.
4,606,721 A 8/1986 Livingston
4,613,299 A 9/1986 Backheim
4,637,792 A 1/1987 Davis
4,651,712 A 3/1987 Davis
4,653,278 A 3/1987 Vinson et al.
4,681,678 A 7/1987 Leaseburge et al.
4,684,465 A 8/1987 Leaseburge et al.
4,753,666 A 6/1988 Pastor et al.
4,762,543 A 8/1988 Pantermuehl et al.
4,817,387 A 4/1989 Lashbrook
4,858,428 A 8/1989 Paul
4,895,710 A 1/1990 Hartmann et al.
4,898,001 A 2/1990 Kuroda et al.
4,946,597 A 8/1990 Sury
4,976,100 A 12/1990 Lee
5,014,785 A 5/1991 Puri et al.
5,044,932 A 9/1991 Martin et al.
5,073,105 A 12/1991 Martin et al.
5,084,438 A 1/1992 Matsubara et al.
5,085,274 A 2/1992 Puri et al.
5,098,282 A 3/1992 Schwartz et al.
5,123,248 A 6/1992 Monty et al.
5,135,387 A 8/1992 Martin et al.
5,141,049 A 8/1992 Larsen et al.
5,142,866 A 9/1992 Yanagihara et al.
5,147,111 A 9/1992 Montgomery
5,154,596 A 10/1992 Schwartz et al.
5,183,232 A 2/1993 Gale
5,195,884 A 3/1993 Schwartz et al.
5,197,289 A 3/1993 Glevicky et al.
5,238,395 A 8/1993 Schwartz et al.
5,255,506 A 10/1993 Wilkes et al.
5,259,342 A * 11/1993 Brady ..................... F22B 21/26 110/234
5,265,410 A 11/1993 Hisatome
5,271,905 A 12/1993 Owen et al.
5,275,552 A 1/1994 Schwartz et al.
5,295,350 A 3/1994 Child et al.
5,304,362 A 4/1994 Madsen
5,325,660 A 7/1994 Taniguchi et al.
5,332,036 A 7/1994 Shirley et al.
5,344,307 A 9/1994 Schwartz et al.
5,345,756 A 9/1994 Jahnke et al.
5,355,668 A 10/1994 Weil et al.
5,359,847 A 11/1994 Pillsbury et al.
5,361,586 A 11/1994 McWhirter et al.
5,388,395 A 2/1995 Scharpf et al.
5,394,688 A 3/1995 Amos
5,402,847 A 4/1995 Wilson et al.
5,444,971 A 8/1995 Holenberger
5,457,951 A 10/1995 Johnson et al.
5,458,481 A 10/1995 Surbey et al.
5,468,270 A 11/1995 Borszynski
5,490,378 A 2/1996 Berger et al.
5,542,840 A 8/1996 Surbey et al.
5,566,756 A 10/1996 Chaback et al.
5,572,862 A 11/1996 Mowill
5,581,998 A 12/1996 Craig
5,584,182 A 12/1996 Althaus et al.
5,590,518 A 1/1997 Janes
5,623,819 A * 4/1997 Bowker .................. F23C 6/047 60/723
5,628,182 A 5/1997 Mowill

(56) References Cited

U.S. PATENT DOCUMENTS

| | | | |
|---|---|---|---|
| 5,634,329 A | 6/1997 | Andersson et al. | |
| 5,638,675 A | 6/1997 | Zysman et al. | |
| 5,640,840 A | 6/1997 | Briesch | |
| 5,657,631 A | 8/1997 | Androsov | |
| 5,680,764 A | 10/1997 | Viteri | |
| 5,685,158 A | 11/1997 | Lenahan et al. | |
| 5,709,077 A | 1/1998 | Beichel | |
| 5,713,206 A | 2/1998 | McWhirter et al. | |
| 5,715,673 A | 2/1998 | Beichel | |
| 5,724,805 A | 3/1998 | Golomb et al. | |
| 5,725,054 A | 3/1998 | Shayegi et al. | |
| 5,740,786 A | 4/1998 | Gartner | |
| 5,743,079 A | 4/1998 | Walsh et al. | |
| 5,765,363 A | 6/1998 | Mowill | |
| 5,771,867 A | 6/1998 | Amstutz et al. | |
| 5,771,868 A | 6/1998 | Khair | |
| 5,819,540 A | 10/1998 | Massarani | |
| 5,832,712 A | 11/1998 | Ronning et al. | |
| 5,836,164 A | 11/1998 | Tsukahara et al. | |
| 5,839,283 A | 11/1998 | Dobbeling | |
| 5,850,732 A | 12/1998 | Willis et al. | |
| 5,894,720 A | 4/1999 | Willis et al. | |
| 5,901,547 A | 5/1999 | Smith et al. | |
| 5,924,275 A | 7/1999 | Cohen et al. | |
| 5,930,990 A | 8/1999 | Zachary et al. | |
| 5,937,634 A | 8/1999 | Etheridge et al. | |
| 5,950,417 A | 9/1999 | Robertson et al. | |
| 5,956,937 A | 9/1999 | Beichel | |
| 5,968,349 A | 10/1999 | Duyvesteyn et al. | |
| 5,974,780 A | 11/1999 | Santos | |
| 5,992,388 A | 11/1999 | Seger | |
| 6,016,658 A | 1/2000 | Willis et al. | |
| 6,032,465 A | 3/2000 | Regnier | |
| 6,035,641 A | 3/2000 | Lokhandwala | |
| 6,062,026 A | 5/2000 | Woollenweber et al. | |
| 6,065,282 A * | 5/2000 | Fukue | F02C 7/185 415/115 |
| 6,079,974 A | 6/2000 | Thompson | |
| 6,082,093 A | 7/2000 | Greenwood et al. | |
| 6,089,855 A | 7/2000 | Becker et al. | |
| 6,094,916 A | 8/2000 | Puri et al. | |
| 6,101,983 A | 8/2000 | Anand et al. | |
| 6,148,602 A | 11/2000 | Demetri | |
| 6,170,264 B1 | 1/2001 | Viteri et al. | |
| 6,183,241 B1 | 2/2001 | Bohn et al. | |
| 6,201,029 B1 | 3/2001 | Waycuilis | |
| 6,202,400 B1 | 3/2001 | Utamura et al. | |
| 6,202,442 B1 | 3/2001 | Brugerolle | |
| 6,202,574 B1 | 3/2001 | Liljedahl et al. | |
| 6,209,325 B1 | 4/2001 | Alkabie | |
| 6,216,459 B1 | 4/2001 | Daudel et al. | |
| 6,216,549 B1 | 4/2001 | Davis et al. | |
| 6,230,103 B1 | 5/2001 | DeCorso et al. | |
| 6,237,339 B1 | 5/2001 | Åsen et al. | |
| 6,247,315 B1 | 6/2001 | Marin et al. | |
| 6,247,316 B1 | 6/2001 | Viteri | |
| 6,248,794 B1 | 6/2001 | Gieskes | |
| 6,253,555 B1 | 7/2001 | Willis | |
| 6,256,976 B1 | 7/2001 | Kataoka et al. | |
| 6,256,994 B1 | 7/2001 | Dillon, IV | |
| 6,263,659 B1 | 7/2001 | Dillon, IV et al. | |
| 6,266,954 B1 | 7/2001 | McCallum et al. | |
| 6,269,882 B1 | 8/2001 | Wellington et al. | |
| 6,276,171 B1 | 8/2001 | Brugerolle | |
| 6,282,901 B1 | 9/2001 | Marin et al. | |
| 6,283,087 B1 | 9/2001 | Isaksen | |
| 6,289,677 B1 | 9/2001 | Prociw et al. | |
| 6,298,652 B1 | 10/2001 | Mittricker et al. | |
| 6,298,654 B1 | 10/2001 | Vermes et al. | |
| 6,298,664 B1 | 10/2001 | Åsen et al. | |
| 6,301,888 B1 | 10/2001 | Gray | |
| 6,301,889 B1 | 10/2001 | Gladden et al. | |
| 6,305,929 B1 | 10/2001 | Chung et al. | |
| 6,314,721 B1 | 11/2001 | Mathews et al. | |
| 6,324,867 B1 | 12/2001 | Fanning et al. | |
| 6,332,313 B1 | 12/2001 | Willis et al. | |
| 6,345,493 B1 | 2/2002 | Smith et al. | |
| 6,360,528 B1 | 3/2002 | Brausch et al. | |
| 6,363,709 B2 | 4/2002 | Kataoka et al. | |
| 6,367,258 B1 | 4/2002 | Wen et al. | |
| 6,370,870 B1 | 4/2002 | Kamijo et al. | |
| 6,374,591 B1 | 4/2002 | Johnson et al. | |
| 6,374,594 B1 | 4/2002 | Kraft et al. | |
| 6,383,461 B1 | 5/2002 | Lang | |
| 6,389,814 B2 | 5/2002 | Viteri et al. | |
| 6,405,536 B1 | 6/2002 | Ho et al. | |
| 6,412,278 B1 | 7/2002 | Matthews | |
| 6,412,302 B1 | 7/2002 | Foglietta | |
| 6,412,559 B1 | 7/2002 | Gunter et al. | |
| 6,418,725 B1 | 7/2002 | Maeda et al. | |
| 6,429,020 B1 | 8/2002 | Thornton et al. | |
| 6,449,954 B2 | 9/2002 | Bachmann | |
| 6,450,256 B2 | 9/2002 | Mones | |
| 6,461,147 B1 | 10/2002 | Sonju et al. | |
| 6,467,270 B2 | 10/2002 | Mulloy et al. | |
| 6,470,682 B2 | 10/2002 | Gray | |
| 6,477,859 B2 | 11/2002 | Wong et al. | |
| 6,484,503 B1 | 11/2002 | Raz | |
| 6,484,507 B1 | 11/2002 | Pradt | |
| 6,487,863 B1 | 12/2002 | Chen et al. | |
| 6,499,990 B1 | 12/2002 | Zink et al. | |
| 6,502,383 B1 | 1/2003 | Janardan et al. | |
| 6,505,567 B1 | 1/2003 | Anderson et al. | |
| 6,505,683 B2 | 1/2003 | Minkkinen et al. | |
| 6,508,209 B1 | 1/2003 | Collier | |
| 6,523,349 B2 | 2/2003 | Viteri | |
| 6,532,745 B1 | 3/2003 | Nealy | |
| 6,539,716 B2 | 4/2003 | Finger et al. | |
| 6,584,775 B1 | 7/2003 | Schneider et al. | |
| 6,598,398 B2 | 7/2003 | Viteri et al. | |
| 6,598,399 B2 | 7/2003 | Liebig | |
| 6,598,402 B2 | 7/2003 | Kataoka et al. | |
| 6,606,861 B2 | 8/2003 | Snyder | |
| 6,612,291 B2 | 9/2003 | Sakamoto | |
| 6,615,576 B2 | 9/2003 | Sheoran et al. | |
| 6,615,589 B2 | 9/2003 | Allam et al. | |
| 6,622,470 B2 | 9/2003 | Viteri et al. | |
| 6,622,645 B2 | 9/2003 | Havlena | |
| 6,637,183 B2 | 10/2003 | Viteri et al. | |
| 6,644,041 B1 | 11/2003 | Eyermann | |
| 6,655,150 B1 | 12/2003 | Åsen et al. | |
| 6,668,541 B2 | 12/2003 | Rice et al. | |
| 6,672,863 B2 | 1/2004 | Doebbeling et al. | |
| 6,675,579 B1 | 1/2004 | Yang | |
| 6,684,643 B2 | 2/2004 | Frutschi | |
| 6,694,735 B2 | 2/2004 | Sumser et al. | |
| 6,698,412 B2 | 3/2004 | Betta | |
| 6,702,570 B2 | 3/2004 | Shah et al. | |
| 6,722,436 B2 | 4/2004 | Krill | |
| 6,725,665 B2 | 4/2004 | Tuschy et al. | |
| 6,731,501 B1 | 5/2004 | Cheng | |
| 6,732,531 B2 | 5/2004 | Dickey | |
| 6,742,506 B1 | 6/2004 | Grandin | |
| 6,743,829 B2 | 6/2004 | Fischer-Calderon et al. | |
| 6,745,573 B2 | 6/2004 | Marin et al. | |
| 6,745,624 B2 | 6/2004 | Porter et al. | |
| 6,748,004 B2 | 6/2004 | Jepson | |
| 6,752,620 B2 | 6/2004 | Heier et al. | |
| 6,767,527 B1 | 7/2004 | Åsen et al. | |
| 6,772,583 B2 | 8/2004 | Bland | |
| 6,790,030 B2 | 9/2004 | Fischer et al. | |
| 6,805,483 B2 | 10/2004 | Tomlinson et al. | |
| 6,810,673 B2 | 11/2004 | Snyder | |
| 6,813,889 B2 | 11/2004 | Inoue et al. | |
| 6,817,187 B2 | 11/2004 | Yu | |
| 6,820,428 B2 | 11/2004 | Wylie | |
| 6,821,501 B2 | 11/2004 | Matzakos et al. | |
| 6,823,852 B2 | 11/2004 | Collier | |
| 6,824,710 B2 | 11/2004 | Viteri et al. | |
| 6,826,912 B2 | 12/2004 | Levy et al. | |
| 6,826,913 B2 | 12/2004 | Wright | |
| 6,838,071 B1 | 1/2005 | Olsvik et al. | |
| 6,851,413 B1 | 2/2005 | Tamol | |
| 6,868,677 B2 | 3/2005 | Viteri et al. | |

(56) References Cited

U.S. PATENT DOCUMENTS 6,886,334 B2 5/2005 Shirakawa
6,887,069 B1 5/2005 Thornton et al.
6,899,859 B1 5/2005 Olsvik
6,901,760 B2 6/2005 Dittmann et al.
6,904,815 B2 6/2005 Widmer
6,907,737 B2 6/2005 Mittricker et al.
6,910,335 B2 6/2005 Viteri et al.
6,923,915 B2 8/2005 Alford et al.
6,939,130 B2 9/2005 Abbasi et al.
6,945,029 B2 9/2005 Viteri
6,945,052 B2 9/2005 Frutschi et al.
6,945,087 B2 9/2005 Porter et al.
6,945,089 B2 9/2005 Barie et al.
6,946,419 B2 9/2005 Kaefer
6,969,123 B2 11/2005 Vinegar et al.
6,971,242 B2 12/2005 Boardman
6,981,358 B2 1/2006 Bellucci et al.
6,988,549 B1 1/2006 Babcock
6,993,901 B2 2/2006 Shirakawa
6,993,916 B2 2/2006 Johnson et al.
6,994,491 B2 2/2006 Kittle
7,007,487 B2 3/2006 Belokon et al.
7,010,921 B2 3/2006 Intile et al.
7,011,154 B2 3/2006 Maher et al.
7,015,271 B2 3/2006 Bice et al.
7,032,388 B2 4/2006 Healy
7,040,400 B2 5/2006 de Rouffignac et al.
7,043,898 B2 5/2006 Rago
7,043,920 B2 5/2006 Viteri et al.
7,045,553 B2 5/2006 Hershkowitz
7,053,128 B2 5/2006 Hershkowitz
7,056,482 B2 6/2006 Hakka et al.
7,059,152 B2 6/2006 Oakey et al.
7,065,953 B1 6/2006 Kopko
7,065,972 B2 6/2006 Zupanc et al.
7,074,033 B2 7/2006 Neary
7,077,199 B2 7/2006 Vinegar et al.
7,089,743 B2 8/2006 Frutschi et al.
7,096,942 B1 8/2006 de Rouffignac et al.
7,097,925 B2 8/2006 Keefer
7,104,319 B2 9/2006 Vinegar et al.
7,104,784 B1 9/2006 Hasegawa et al.
7,124,589 B2 10/2006 Neary
7,137,256 B1 11/2006 Stuttaford et al.
7,137,623 B2 11/2006 Mockry et al.
7,143,572 B2 12/2006 Ooka et al.
7,143,606 B2 12/2006 Tranier
7,146,969 B2 12/2006 Weirich
7,147,461 B2 12/2006 Neary
7,148,261 B2 12/2006 Hershkowitz et al.
7,152,409 B2 12/2006 Yee et al.
7,162,875 B2 1/2007 Fletcher et al.
7,168,265 B2 1/2007 Briscoe et al.
7,168,488 B2 1/2007 Olsvik et al.
7,183,328 B2 2/2007 Hershkowitz et al.
7,185,497 B2 3/2007 Dudebout et al.
7,194,869 B2 3/2007 McQuiggan et al.
7,197,880 B2 4/2007 Thornton et al.
7,217,303 B2 5/2007 Hershkowitz et al.
7,225,623 B2 6/2007 Koshoffer
7,237,385 B2 7/2007 Carrea
7,284,362 B2 10/2007 Marin et al.
7,299,619 B2 11/2007 Briesch et al.
7,299,868 B2 11/2007 Zapadinski
7,302,801 B2 12/2007 Chen
7,305,817 B2 12/2007 Blodgett et al.
7,305,831 B2 12/2007 Carrea et al.
7,313,916 B2 1/2008 Pellizzari
7,318,317 B2 1/2008 Carrea
7,343,742 B2 3/2008 Wimmer et al.
7,353,655 B2 4/2008 Bolis et al.
7,357,857 B2 4/2008 Hart et al.
7,363,756 B2 4/2008 Carrea et al.
7,363,764 B2 4/2008 Griffin et al.
7,381,393 B2 6/2008 Lynn
7,401,577 B2 7/2008 Saucedo et al.
7,410,525 B1 8/2008 Liu et al.
7,416,137 B2 8/2008 Hagen et al.
7,434,384 B2 10/2008 Lord et al.
7,438,744 B2 10/2008 Beaumont
7,467,942 B2 12/2008 Carroni et al.
7,468,173 B2 12/2008 Hughes et al.
7,472,550 B2 1/2009 Lear et al.
7,481,048 B2 1/2009 Harmon et al.
7,481,275 B2 1/2009 Olsvik et al.
7,482,500 B2 1/2009 Johann et al.
7,485,761 B2 2/2009 Schindler et al.
7,488,857 B2 2/2009 Johann et al.
7,490,472 B2 2/2009 Lynghjem et al.
7,491,250 B2 2/2009 Hershkowitz et al.
7,492,054 B2 2/2009 Catlin
7,493,769 B2 2/2009 Jangili
7,498,009 B2 3/2009 Leach et al.
7,503,178 B2 3/2009 Bucker et al.
7,503,948 B2 3/2009 Hershkowitz et al.
7,506,501 B2 3/2009 Anderson et al.
7,513,099 B2 4/2009 Nuding et al.
7,513,100 B2 4/2009 Motter et al.
7,516,626 B2 4/2009 Brox et al.
7,520,134 B2 4/2009 Durbin et al.
7,523,603 B2 4/2009 Hagen et al.
7,536,252 B1 5/2009 Hibshman et al.
7,536,873 B2 5/2009 Nohlen
7,540,150 B2 6/2009 Schmid et al.
7,559,977 B2 7/2009 Fleischer et al.
7,562,519 B1 7/2009 Harris et al.
7,562,529 B2 7/2009 Kuspert et al.
7,566,394 B2 7/2009 Koseoglu
7,574,856 B2 8/2009 Mak
7,591,866 B2 9/2009 Bose
7,594,386 B2 9/2009 Narayanan et al.
7,610,752 B2 11/2009 Betta et al.
7,610,759 B2 11/2009 Yoshida et al.
7,611,681 B2 11/2009 Kaefer
7,614,352 B2 11/2009 Anthony et al.
7,618,606 B2 11/2009 Fan et al.
7,631,493 B2 12/2009 Shirakawa et al.
7,634,915 B2 12/2009 Hoffmann et al.
7,635,408 B2 12/2009 Mak et al.
7,637,093 B2 12/2009 Rao
7,644,573 B2 1/2010 Smith et al.
7,650,744 B2 1/2010 Varatharajan et al.
7,654,320 B2 2/2010 Payton
7,654,330 B2 2/2010 Zubrin et al.
7,655,071 B2 2/2010 De Vreede
7,670,135 B1 3/2010 Zink et al.
7,673,454 B2 3/2010 Saito et al.
7,673,685 B2 3/2010 Shaw et al.
7,674,443 B1 3/2010 Davis
7,677,309 B2 3/2010 Shaw et al.
7,681,394 B2 3/2010 Haugen
7,682,597 B2 3/2010 Blumenfeld et al.
7,690,204 B2 4/2010 Drnevich et al.
7,691,788 B2 4/2010 Tan et al.
7,695,703 B2 4/2010 Sobolevskiy et al.
7,717,173 B2 5/2010 Grott
7,721,543 B2 5/2010 Massey et al.
7,726,114 B2 6/2010 Evulet
7,734,408 B2 6/2010 Shiraki
7,739,864 B2 6/2010 Finkenrath et al.
7,749,311 B2 7/2010 Saito et al.
7,752,848 B2 7/2010 Balan et al.
7,752,850 B2 7/2010 Laster et al.
7,753,039 B2 7/2010 Harima et al.
7,753,972 B2 7/2010 Zubrin et al.
7,762,084 B2 7/2010 Martis et al.
7,763,163 B2 7/2010 Koseoglu
7,763,227 B2 7/2010 Wang
7,765,810 B2 8/2010 Pfefferle
7,788,897 B2 9/2010 Campbell et al.
7,789,159 B1 9/2010 Bader
7,789,658 B2 9/2010 Towler et al.
7,789,944 B2 9/2010 Saito et al.
7,793,494 B2 9/2010 Wirth et al.

(56) References Cited

U.S. PATENT DOCUMENTS 7,802,434 B2 9/2010 Varatharajan et al.
7,815,873 B2 10/2010 Sankaranarayanan et al.
7,815,892 B2 10/2010 Hershkowitz et al.
7,819,951 B2 10/2010 White et al.
7,824,179 B2 11/2010 Hasegawa et al.
7,827,778 B2 11/2010 Finkenrath et al.
7,827,794 B1 11/2010 Pronske et al.
7,841,186 B2 11/2010 So et al.
7,845,406 B2 12/2010 Nitschke
7,846,401 B2 12/2010 Hershkowitz et al.
7,861,511 B2 1/2011 Chillar et al.
7,874,140 B2 1/2011 Fan et al.
7,874,350 B2 1/2011 Pfefferle
7,875,402 B2 1/2011 Hershkowitz et al.
7,882,692 B2 2/2011 Pronske et al.
7,886,522 B2 2/2011 Kammel
7,895,822 B2 * 3/2011 Hoffmann ................ F02C 3/02 60/39.5
7,896,105 B2 3/2011 Dupriest
7,906,304 B2 3/2011 Kohr
7,909,898 B2 3/2011 White et al.
7,914,749 B2 3/2011 Carstens et al.
7,914,764 B2 3/2011 Hershkowitz et al.
7,918,906 B2 4/2011 Zubrin et al.
7,921,633 B2 4/2011 Rising
7,921,653 B2 4/2011 Som et al.
7,922,871 B2 4/2011 Price et al.
7,926,292 B2 4/2011 Rabovitser et al.
7,931,712 B2 4/2011 Zubrin et al.
7,931,731 B2 4/2011 Van Heeringen et al.
7,931,888 B2 4/2011 Drnevich et al.
7,934,926 B2 5/2011 Kornbluth et al.
7,942,003 B2 5/2011 Baudoin et al.
7,942,008 B2 5/2011 Joshi et al.
7,943,097 B2 5/2011 Golden et al.
7,955,403 B2 6/2011 Ariyapadi et al.
7,966,822 B2 6/2011 Myers et al.
7,976,803 B2 7/2011 Hooper et al.
7,980,312 B1 7/2011 Hill et al.
7,985,399 B2 7/2011 Drnevich et al.
7,988,750 B2 8/2011 Lee et al.
8,001,789 B2 8/2011 Vega et al.
8,029,273 B2 10/2011 Paschereit et al.
8,036,813 B2 10/2011 Tonetti et al.
8,038,416 B2 10/2011 Ono et al.
8,038,746 B2 10/2011 Clark
8,038,773 B2 10/2011 Ochs et al.
8,046,986 B2 11/2011 Chillar et al.
8,047,007 B2 * 11/2011 Zubrin .................. F01K 13/00 60/39.182
8,051,638 B2 11/2011 Aljabari et al.
8,061,120 B2 11/2011 Hwang
8,062,617 B2 11/2011 Stakhev et al.
8,065,870 B2 11/2011 Jobson et al.
8,065,874 B2 11/2011 Fong et al.
8,074,439 B2 12/2011 Foret
8,080,225 B2 12/2011 Dickinson et al.
8,083,474 B2 12/2011 Hashimoto et al.
8,097,230 B2 1/2012 Mesters et al.
8,101,146 B2 1/2012 Fedeyko et al.
8,105,559 B2 1/2012 Melville et al.
8,110,012 B2 2/2012 Chiu et al.
8,117,825 B2 2/2012 Griffin et al.
8,117,846 B2 2/2012 Wilbraham
8,127,558 B2 3/2012 Bland et al.
8,127,936 B2 3/2012 Liu et al.
8,127,937 B2 3/2012 Liu et al.
8,133,298 B2 3/2012 Lanyi et al.
8,166,766 B2 * 5/2012 Draper ..................... F02C 1/06 60/39.52
8,167,960 B2 5/2012 Gil
8,176,982 B2 5/2012 Gil et al.
8,191,360 B2 6/2012 Fong et al.
8,191,361 B2 6/2012 Fong et al.
8,196,387 B2 6/2012 Shah et al.
8,196,413 B2 6/2012 Mak
8,201,402 B2 6/2012 Fong et al.
8,205,455 B2 6/2012 Popovic
8,206,669 B2 6/2012 Schaffer et al.
8,209,192 B2 6/2012 Gil et al.
8,215,105 B2 7/2012 Fong et al.
8,220,247 B2 7/2012 Wijmans et al.
8,220,248 B2 7/2012 Wijmans et al.
8,220,268 B2 7/2012 Callas
8,225,600 B2 7/2012 Theis
8,226,912 B2 7/2012 Kloosterman et al.
8,240,142 B2 8/2012 Fong et al.
8,240,153 B2 8/2012 Childers et al.
8,245,492 B2 8/2012 Draper
8,245,493 B2 8/2012 Minto
8,247,462 B2 8/2012 Boshoff et al.
8,257,476 B2 9/2012 White et al.
8,261,823 B1 9/2012 Hill et al.
8,262,343 B2 9/2012 Hagen
8,266,883 B2 9/2012 Ouellet et al.
8,266,913 B2 9/2012 Snook et al.
8,268,044 B2 9/2012 Wright et al.
8,281,596 B1 * 10/2012 Rohrssen ................ F23R 3/002 60/737
8,316,665 B2 11/2012 Mak
8,316,784 B2 11/2012 D'Agostini
8,337,613 B2 12/2012 Zauderer
8,347,600 B2 1/2013 Wichmann et al.
8,348,551 B2 1/2013 Baker et al.
8,371,100 B2 2/2013 Draper
8,372,251 B2 2/2013 Goller et al.
8,375,726 B2 2/2013 Wiebe et al.
8,377,184 B2 2/2013 Fujikawa et al.
8,377,401 B2 2/2013 Darde et al.
8,388,919 B2 3/2013 Hooper et al.
8,397,482 B2 3/2013 Kraemer et al.
8,398,757 B2 3/2013 Iijima et al.
8,409,307 B2 4/2013 Drnevich et al.
8,414,694 B2 4/2013 Iijinia et al.
8,424,282 B2 4/2013 Vollmer et al.
8,424,601 B2 4/2013 Betzer-Zilevitch
8,436,489 B2 5/2013 Stahlkopf et al.
8,448,416 B2 5/2013 Davis, Jr. et al.
8,453,461 B2 6/2013 Draper
8,453,462 B2 6/2013 Wichmann et al.
8,453,583 B2 6/2013 Malavasi et al.
8,454,350 B2 6/2013 Berry et al.
8,475,160 B2 7/2013 Campbell et al.
8,539,749 B1 9/2013 Wichmann et al.
8,567,200 B2 10/2013 Brook et al.
8,616,294 B2 12/2013 Zubrin et al.
8,627,643 B2 1/2014 Chillar et al.
9,869,279 B2 * 1/2018 Stoia ...................... F02M 26/19
9,890,955 B2 * 2/2018 Freitag ...................... F02C 7/22
9,903,588 B2 * 2/2018 Slobodyanskiy ......... F23N 1/02
2001/0000049 A1 3/2001 Kataoka et al.
2001/0029732 A1 10/2001 Bachmann
2001/0045090 A1 11/2001 Gray
2002/0043063 A1 4/2002 Kataoka et al.
2002/0053207 A1 5/2002 Finger et al.
2002/0069648 A1 6/2002 Levy et al.
2002/0083711 A1 * 7/2002 Dean ......................... F23R 3/04 60/737
2002/0187449 A1 12/2002 Doebbeling et al.
2003/0005698 A1 1/2003 Keller
2003/0075332 A1 * 4/2003 Krill ........................ B01J 19/14 166/305.1
2003/0131582 A1 7/2003 Anderson et al.
2003/0134241 A1 7/2003 Marin et al.
2003/0221409 A1 12/2003 McGowan
2004/0006994 A1 1/2004 Walsh et al.
2004/0068981 A1 4/2004 Siefker et al.
2004/0166034 A1 8/2004 Kaefer
2004/0170559 A1 9/2004 Hershkowitz et al.
2004/0223408 A1 11/2004 Mathys et al.
2004/0238654 A1 12/2004 Hagen et al.
2005/0028529 A1 2/2005 Bartlett et al.
2005/0144961 A1 7/2005 Colibaba-Evulet et al.
2005/0197267 A1 9/2005 Zaki et al.

(56) References Cited

U.S. PATENT DOCUMENTS

2005/0229585 A1 10/2005 Webster
2005/0236602 A1 10/2005 Viteri et al.
2005/0268615 A1* 12/2005 Bunker .................. F23R 3/002 60/772
2006/0112675 A1 6/2006 Anderson et al.
2006/0112696 A1* 6/2006 Lynghjem ............. B01D 53/62 60/772
2006/0158961 A1 7/2006 Ruscheweyh et al.
2006/0183009 A1 8/2006 Berlowitz et al.
2006/0196812 A1 9/2006 Beetge et al.
2006/0248888 A1 11/2006 Geskes
2006/0272331 A1* 12/2006 Bucker .................. C01B 3/386 60/774
2007/0000242 A1 1/2007 Harmon et al.
2007/0022758 A1* 2/2007 Myers .................... F02C 3/145 60/776
2007/0044475 A1 3/2007 Leser et al.
2007/0044479 A1 3/2007 Brandt et al.
2007/0089425 A1 4/2007 Motter et al.
2007/0107430 A1 5/2007 Schmid et al.
2007/0144747 A1 6/2007 Steinberg
2007/0231233 A1 10/2007 Bose
2007/0234702 A1 10/2007 Hagen et al.
2007/0245736 A1 10/2007 Barnicki
2007/0249738 A1 10/2007 Haynes et al.
2007/0272201 A1 11/2007 Amano et al.
2008/0000229 A1 1/2008 Kuspert et al.
2008/0006561 A1 1/2008 Moran et al.
2008/0010967 A1 1/2008 Griffin et al.
2008/0034727 A1 2/2008 Sutikno
2008/0038598 A1 2/2008 Berlowitz et al.
2008/0047280 A1 2/2008 Dubar
2008/0066443 A1 3/2008 Frutschi et al.
2008/0115478 A1 5/2008 Sullivan
2008/0118310 A1 5/2008 Graham
2008/0127632 A1 6/2008 Finkenrath et al.
2008/0155984 A1 7/2008 Liu et al.
2008/0178611 A1 7/2008 Ding
2008/0202123 A1 8/2008 Sullivan et al.
2008/0223038 A1 9/2008 Lutz et al.
2008/0250795 A1 10/2008 Katdare et al.
2008/0251234 A1 10/2008 Wilson et al.
2008/0290719 A1 11/2008 Kaminsky et al.
2008/0309087 A1 12/2008 Evulet et al.
2009/0000762 A1 1/2009 Wilson et al.
2009/0025390 A1 1/2009 Christensen et al.
2009/0038247 A1 2/2009 Taylor et al.
2009/0056342 A1 3/2009 Kirzhner
2009/0064653 A1 3/2009 Hagen et al.
2009/0071166 A1 3/2009 Hagen et al.
2009/0107141 A1 4/2009 Chillar et al.
2009/0117024 A1 5/2009 Weedon et al.
2009/0120087 A1 5/2009 Sumser et al.
2009/0133403 A1* 5/2009 Som ....................... F01D 9/023 60/752
2009/0145132 A1* 6/2009 Johnson ................. F23R 3/002 60/755
2009/0157230 A1 6/2009 Hibshman et al.
2009/0193809 A1 8/2009 Schroder et al.
2009/0205334 A1 8/2009 Aljabari et al.
2009/0218821 A1 9/2009 ElKady et al.
2009/0223227 A1 9/2009 Lipinski et al.
2009/0229263 A1 9/2009 Ouellet et al.
2009/0235637 A1 9/2009 Foret
2009/0241506 A1 10/2009 Nilsson
2009/0255242 A1 10/2009 Paterson et al.
2009/0262599 A1 10/2009 Kohrs et al.
2009/0284013 A1* 11/2009 Anand .............. B01D 53/8625 290/52
2009/0301054 A1 12/2009 Simpson et al.
2009/0301099 A1 12/2009 Nigro
2010/0003123 A1 1/2010 Smith
2010/0018218 A1 1/2010 Riley et al.
2010/0031665 A1* 2/2010 Chokshi ................. F01D 5/186 60/760
2010/0058732 A1 3/2010 Kaufmann et al.
2010/0115960 A1 5/2010 Brautsch et al.
2010/0126176 A1 5/2010 Kim
2010/0126906 A1 5/2010 Sury
2010/0162703 A1 7/2010 Li et al.
2010/0170253 A1 7/2010 Berry et al.
2010/0180565 A1 7/2010 Draper
2010/0229564 A1* 9/2010 Chila ....................... F23R 3/06 60/752
2010/0293957 A1* 11/2010 Chen ...................... F01D 9/023 60/752
2010/0300102 A1 12/2010 Bathina et al.
2010/0310439 A1 12/2010 Brok et al.
2010/0322759 A1 12/2010 Tanioka
2010/0326084 A1 12/2010 Anderson et al.
2011/0000221 A1 1/2011 Minta et al.
2011/0000671 A1 1/2011 Hershkowitz et al.
2011/0036082 A1 2/2011 Collinot
2011/0048002 A1 3/2011 Taylor et al.
2011/0048010 A1 3/2011 Balcezak et al.
2011/0072779 A1 3/2011 ELKady et al.
2011/0088379 A1 4/2011 Nanda
2011/0110759 A1 5/2011 Sanchez et al.
2011/0126512 A1 6/2011 Anderson
2011/0138766 A1 6/2011 ELKady et al.
2011/0162353 A1 7/2011 Vanvolsem et al.
2011/0162375 A1* 7/2011 Berry ..................... F02C 7/222 60/746
2011/0203287 A1* 8/2011 Chila ....................... F02K 1/82 60/758
2011/0205837 A1 8/2011 Gentgen
2011/0226010 A1 9/2011 Baxter
2011/0227346 A1 9/2011 Klenven
2011/0232545 A1 9/2011 Clements
2011/0239652 A1* 10/2011 McMahan .............. F23R 3/286 60/737
2011/0239653 A1* 10/2011 Valeev ................... F23R 3/286 60/740
2011/0247341 A1* 10/2011 McMahan ............. F23M 5/085 60/757
2011/0265447 A1 11/2011 Cunningham
2011/0289898 A1* 12/2011 Hellat .................... F01K 23/10 60/39.52
2011/0289899 A1* 12/2011 De La Cruz Garcia .................... F01K 17/04 60/39.182
2011/0300493 A1 12/2011 Mittricker et al.
2011/0302922 A1* 12/2011 Li ........................ F01K 23/101 60/645
2012/0023954 A1 2/2012 Wichmann
2012/0023955 A1 2/2012 Draper
2012/0023956 A1 2/2012 Popovic
2012/0023957 A1 2/2012 Draper et al.
2012/0023958 A1 2/2012 Snook et al.
2012/0023960 A1 2/2012 Minto
2012/0023962 A1 2/2012 Wichmann et al.
2012/0023963 A1 2/2012 Wichmann et al.
2012/0023966 A1 2/2012 Ouellet et al.
2012/0031581 A1 2/2012 Chillar et al.
2012/0032810 A1 2/2012 Chillar et al.
2012/0085100 A1 4/2012 Hughes et al.
2012/0096870 A1 4/2012 Wichmann et al.
2012/0119512 A1 5/2012 Draper
2012/0131925 A1 5/2012 Mittricker et al.
2012/0144837 A1 6/2012 Rasmussen et al.
2012/0185144 A1 7/2012 Draper
2012/0186268 A1* 7/2012 Rofka ...................... F02C 3/34 60/783
2012/0192565 A1 8/2012 Tretyakov et al.
2012/0247105 A1 10/2012 Nelson et al.
2012/0260660 A1* 10/2012 Kraemer .................. F02C 3/34 60/772
2013/0086916 A1 4/2013 Oelfke et al.
2013/0086917 A1* 4/2013 Slobodyanskiy ......... F23R 3/28 60/773
2013/0091853 A1 4/2013 Denton et al.

(56) References Cited

U.S. PATENT DOCUMENTS

2013/0091854 A1 4/2013 Gupta et al.
2013/0098048 A1* 4/2013 Popovic .................... F23R 3/28 60/772
2013/0104562 A1 5/2013 Oelfke et al.
2013/0104563 A1 5/2013 Oelfke et al.
2013/0125554 A1* 5/2013 Mittricker ............... F01K 23/10 60/772
2013/0125555 A1 5/2013 Mittricker et al.
2013/0125798 A1* 5/2013 Taylor ....................... F23C 9/00 110/205
2013/0232980 A1 9/2013 Chen et al.
2013/0269310 A1 10/2013 Wichmann et al.
2013/0269311 A1 10/2013 Wichmann et al.
2013/0269355 A1 10/2013 Wichmann et al.
2013/0269356 A1 10/2013 Butkiewicz et al.
2013/0269357 A1 10/2013 Wichmann et al.
2013/0269358 A1 10/2013 Wichmann et al.
2013/0269360 A1 10/2013 Wichmann et al.
2013/0269361 A1 10/2013 Wichmann et al.
2013/0269362 A1 10/2013 Wichmann et al.
2013/0283808 A1 10/2013 Kolvick
2013/0327050 A1* 12/2013 Slobodyanskiy ......... F23L 7/00 60/772
2013/0340404 A1* 12/2013 Hughes ..................... F02C 7/08 60/39.52
2014/0000271 A1 1/2014 Mittricker et al.
2014/0000273 A1 1/2014 Mittricker et al.
2014/0007590 A1 1/2014 Huntington et al.
2014/0013766 A1 1/2014 Mittricker et al.
2014/0020398 A1 1/2014 Mittricker et al.
2014/0060073 A1 3/2014 Slobodyanskiy et al.
2014/0123620 A1 5/2014 Huntington et al.
2014/0123624 A1 5/2014 Minto
2014/0123659 A1 5/2014 Biyani et al.
2014/0123660 A1* 5/2014 Stoia ....................... F23R 3/005 60/772
2014/0123668 A1 5/2014 Huntington et al.
2014/0123669 A1 5/2014 Huntington et al.
2014/0123672 A1 5/2014 Huntington et al.
2014/0150445 A1 6/2014 Huntington et al.
2014/0182298 A1 7/2014 Krull et al.
2014/0182299 A1 7/2014 Woodall et al.
2014/0182301 A1* 7/2014 Fadde ....................... F02C 3/34 60/783
2014/0182302 A1* 7/2014 Antoniono ................ F23R 3/10 60/783
2014/0182303 A1* 7/2014 Antoniono ................ F23R 3/10 60/783
2014/0182304 A1* 7/2014 Antoniono ................ F23R 3/04 60/783
2014/0182305 A1* 7/2014 Antoniono ................ F02C 3/34 60/783
2014/0196464 A1 7/2014 Biyani et al.
2014/0216011 A1 8/2014 Muthaiah et al.
2014/0272736 A1* 9/2014 Robertson ............... F23C 6/047 431/12
2014/0360195 A1* 12/2014 Beran ..................... F23R 3/002 60/734
2015/0000292 A1 1/2015 Subramaniyan
2015/0000293 A1 1/2015 Thatcher et al.
2015/0000294 A1 1/2015 Minto et al.
2015/0000299 A1* 1/2015 Zuo ......................... F02C 7/222 60/776
2015/0033748 A1 2/2015 Vaezi
2015/0033749 A1* 2/2015 Slobodyanskiy ......... F02C 3/34 60/772
2015/0033751 A1 2/2015 Andrew
2015/0033757 A1 2/2015 White et al.
2015/0040574 A1 2/2015 Wichmann et al.
2015/0059350 A1 3/2015 Kolvick et al.
2015/0075171 A1 3/2015 Sokolov et al.
2015/0118019 A1* 4/2015 Maurer ................... F01D 25/14 415/1
2015/0152791 A1 6/2015 White
2015/0198089 A1 7/2015 Muthaiah et al.
2015/0204239 A1 7/2015 Minto et al.
2015/0214879 A1 7/2015 Huntington et al.
2015/0226133 A1 8/2015 Minto et al.
2015/0377134 A1* 12/2015 Maurer ..................... F02C 7/18 60/754
2016/0076772 A1* 3/2016 Metternich ............... F23R 3/18 60/772
2016/0109135 A1* 4/2016 Kidder ...................... F23R 3/60 60/796
2016/0186658 A1 6/2016 Vorel et al.
2016/0190963 A1 6/2016 Thatcher et al.
2016/0201916 A1* 7/2016 Allen ...................... F23R 3/045 60/772
2016/0222883 A1* 8/2016 Allen ........................ F02C 3/34
2016/0222884 A1* 8/2016 Allen ........................ F02C 3/34
2016/0223202 A1* 8/2016 Borchert .................. F23R 3/28
2016/0265776 A1* 9/2016 Maurer ................... F23R 3/002
2017/0108221 A1* 4/2017 Mizukami ................. F23R 3/06

FOREIGN PATENT DOCUMENTS

EP 0770771 5/1997
EP 2578942 A2 4/2013
GB 0776269 6/1957
GB 2117053 10/1983
WO WO1999006674 2/1999
WO WO1999063210 12/1999
WO WO2007068682 6/2007
WO 2008/023986 A1 2/2008
WO WO2008142009 11/2008
WO WO2011003606 1/2011
WO WO2012003489 1/2012
WO WO2012128928 9/2012
WO WO2012128929 9/2012
WO WO2012170114 12/2012
WO WO2013147632 10/2013
WO WO2013147633 10/2013
WO WO2013155214 10/2013
WO WO2013163045 10/2013
WO WO2014071118 5/2014
WO WO2014071215 5/2014
WO WO2014133406 9/2014

OTHER PUBLICATIONS

U.S. Appl. No. 15/059,143, filed Mar. 2, 2016, Ilya Aleksandrovich Slobodyanskiy.
U.S. Appl. No. 15/060,089, filed Mar. 3, 2016, Srinivas Pakkala.
U.S. Appl. No. 15/009,780, filed Jan. 28, 2016, Richard A. Huntington.
U.S. Appl. No. 14/771,450, filed Feb. 28, 2013, Valeen et al.
U.S. Appl. No. 14/067,552, filed Sep. 9, 2014, Huntington et al.
U.S. Appl. No. 14/553,458, filed Nov. 25, 2014, Huntington et al.
U.S. Appl. No. 14/599,750, filed Jan. 19, 2015, O'Dea et al.
U.S. Appl. No. 14/712,723, filed May 14, 2015, Manchikanti et al.
U.S. Appl. No. 14/726,001, filed May 29, 2015, Della-Fera et al.
U.S. Appl. No. 14/741,189, filed Jun. 16, 2015, Minto et al.
U.S. Appl. No. 14/745,095, filed Jun. 19, 2015, Minto et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.

(56) References Cited

OTHER PUBLICATIONS

Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment" $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), San Antonio, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown, WV; NASA Glenn Research Center (US), 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

* cited by examiner

TURBINE SYSTEM WITH EXHAUST GAS RECIRCULATION, SEPARATION AND EXTRACTION

CROSS-REFERENCE TO RELATED APPLICATION

This application claims priority to and benefit of U.S. Provisional Patent Application No. 62/112,123, entitled "TURBINE SYSTEM WITH EXHAUST GAS RECIRCULATION, SEPARATION AND EXTRACTION," filed on Feb. 4, 2015, which is incorporated by reference herein in its entirety for all purposes.

BACKGROUND

The subject matter disclosed herein relates to gas turbine engines, and more particularly, to systems for exhausting combustion gases from gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion products. These combustion products may include unburnt fuel, residual oxidant, and various emissions (e.g., nitrogen oxides) depending on the condition of combustion. Gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a turbine combustor having a first volume configured to receive a combustion fluid and to direct the combustion fluid into a combustion chamber. The turbine combustor includes a second volume configured to receive a first flow of an exhaust gas and to direct the first flow of the exhaust gas into the combustion chamber. The turbine combustor also includes a third volume disposed axially downstream from the first volume and circumferentially about the second volume. The third volume is configured to receive a second flow of the exhaust gas and to direct the second flow of the exhaust gas out of the turbine combustor via an extraction outlet, and the third volume is isolated from the first volume and from the second volume.

In one embodiment, a system includes a turbine combustor having a housing, a liner defining a combustion chamber, and a flow sleeve disposed about the liner. The turbine combustor also includes a first volume disposed in a head end of the combustion chamber, wherein the first volume is configured to receive a combustion fluid and to provide the combustion fluid to the combustion chamber. The turbine combustor also includes a second volume disposed downstream of the first volume and defined between the flow sleeve and the housing. The second volume is configured to receive a first flow of recirculated combustion products and to direct the first flow of recirculated combustion products out of the combustor via an extraction conduit. A flange extends between the flow sleeve and the housing, and the flange is configured to block flow of the combustion fluid into the second volume and to block flow of the first flow of recirculated combustion products into the first volume.

In one embodiment, a method includes combusting an oxidant and a fuel in a combustion chamber of a turbine combustor to generate combustion products. The method also includes compressing at least some of the combustion products generated by the combustor to generate compressed combustion products. The method further includes cooling a liner of the turbine combustor using a first flow of the compressed combustion products and isolating a second flow of the compressed combustion products within the turbine combustor from the oxidant, the fuel, and the first flow of the compressed combustion products.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
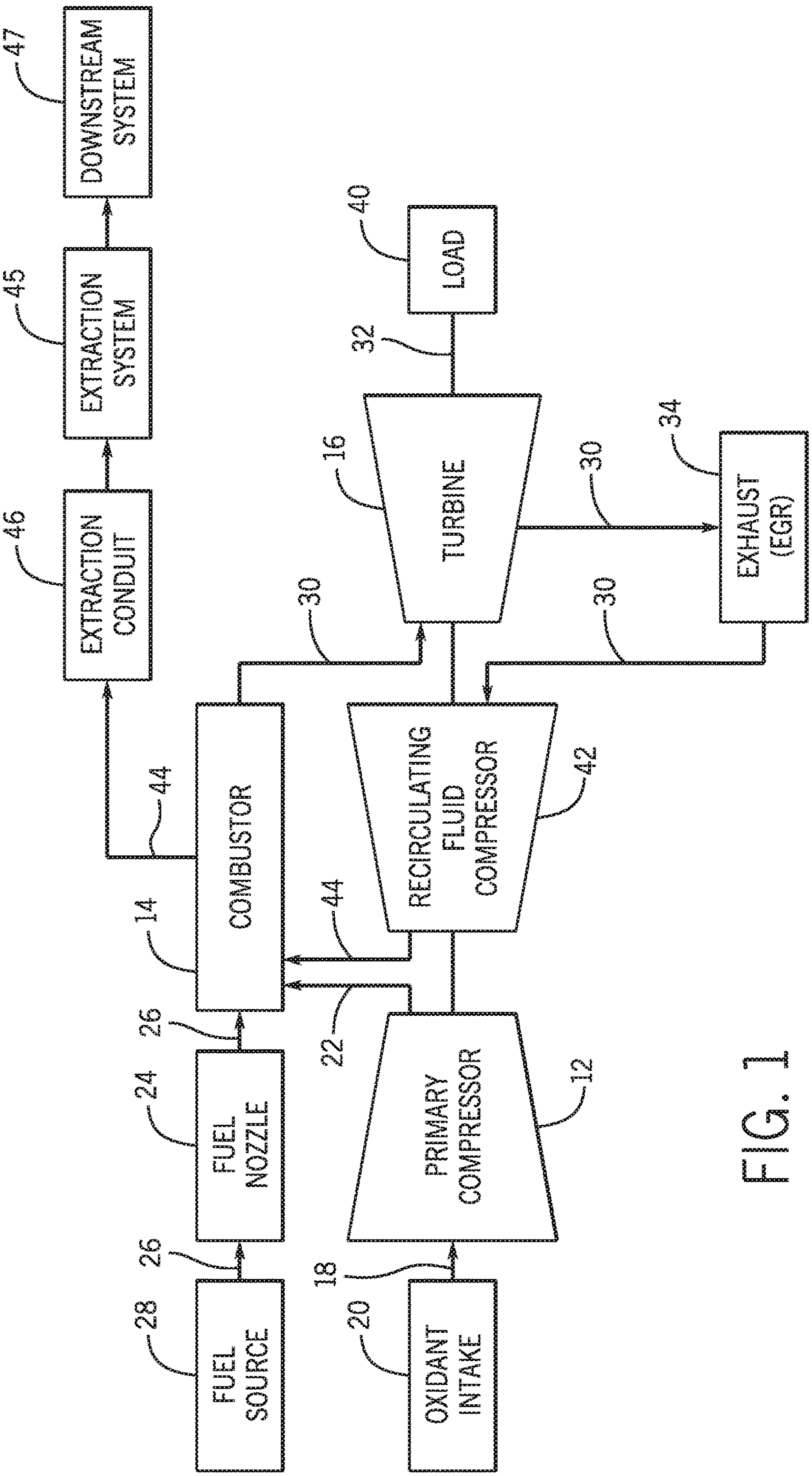
FIG. 1 is a schematic diagram of an embodiment of a gas turbine system configured to recirculate combustion products generated by a turbine combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms “a”, “an” and “the” are intended to include the plural forms as well, unless the context clearly indicates otherwise. The terms “comprises”, “comprising”, “includes” and/or “including”, when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term “and/or” includes any, and all, combinations of one or more of the associated listed items.

Certain terminology may be used herein for the convenience of the reader only and is not to be taken as a limitation on the scope of the invention. For example, words such as “upper”, “lower”, “left”, “right”, “front”, “rear”, “top”, “bottom”, “horizontal”, “vertical”, “upstream”, “downstream”, “fore”, “aft”, and the like; merely describe the configuration shown in the FIGS. Indeed, the element or elements of an embodiment of the present invention may be oriented in any direction and the terminology, therefore, should be understood as encompassing such variations.

As discussed in detail below, the disclosed embodiments relate generally to gas turbine systems with exhaust gas recirculation (EGR), and particularly stoichiometric operation of the gas turbine systems using EGR. The gas turbine systems disclosed herein may be coupled to a hydrocarbon production system and/or include a control system, a combined cycle system, an exhaust gas supply system, and/or an exhaust gas processing system, and each of these systems may be configured and operated as described in U.S. Patent Application No. 2014/0182301, entitled “SYSTEM AND METHOD FOR A TURBINE COMBUSTOR,” filed on Oct. 30, 2013, and U.S. Patent Application No. 2014/0123660, entitled “SYSTEM AND METHOD FOR A TURBINE COMBUSTOR,” filed on Oct. 30, 2013, both of which are hereby incorporated by reference in its entirety for all purposes. For example, the gas turbine systems may include stoichiometric exhaust gas recirculation (SEGR) gas turbine engines configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames (e.g., using diffusion fuel nozzles), premix flames (e.g., using premix fuel nozzles), or any combination thereof. In certain embodiments, the diffusion flames may help to maintain stability and operation within certain limits for stoichiometric combustion, which in turn helps to increase production of $CO_2$. For example, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

In particular, present embodiments are directed toward gas turbine systems, namely stoichiometric exhaust gas recirculation (SEGR) systems having features configured to recirculate combustion products and to direct the recirculated combustion products to various locations within a combustor of the engine. For example, a combustion fluid (e.g., a mixture of oxidant and fuel) may combust within a combustion chamber of the combustor, and the hot combustion gases (e.g., combustion products) drive rotation of a turbine. At least some of the combustion products may be recirculated through the combustor, i.e., exhaust gas recirculation (EGR). In some cases, the combustion products may be directed from the turbine to a recirculating fluid compressor (e.g., EGR compressor) that compresses the combustion products, thereby generating compressed combustion products (e.g., a recirculating fluid or EGR fluid). Some of the recirculating fluid (e.g., a first flow of the recirculating fluid) may pass through an impingement sleeve in a transition piece of the combustor and travel along a combustor liner, thereby cooling the combustor liner. The first flow of the recirculating fluid may then enter the combustion chamber via one or more openings in a forward portion (e.g., upstream portion) of the combustor liner and mix with the combustion fluids in the combustion chamber. In certain embodiments, some of the recirculating fluid (e.g., a second flow of the recirculating fluid) may be directed toward and extracted through an extraction conduit. The recirculating fluid extracted via the extraction conduit may be used in any of a variety of downstream processes, such as enhanced oil recovery (EOR), carbon sequestration, $CO_2$ injection into a well, and so forth.

The gas turbine system may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system may result in products of combustion or exhaust gas with substantially no unburnt fuel or oxidant remaining. For example, the exhaust gas may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system).

In the disclosed embodiments, various flow separating and flow guiding elements are provided to separate the combustion fluid (e.g., fuel, oxidant, etc.), the first flow of recirculating fluid (e.g., EGR fluid), and the second flow of recirculating fluid (e.g., EGR fluid) from one another and to direct these fluids to appropriate locations. For example, a flow sleeve may separate the first flow of the recirculating fluid that flows along the combustor liner from the second flow of the recirculating fluid that flows toward the extraction conduit. By way of another example, a flange may extend radially outward from the flow sleeve toward a combustor housing (e.g., case), thereby separating the second flow of the recirculating fluid from the combustion fluid in a head end of the combustor. The disclosed embodiments may advantageously recirculate the combustion products for cooling the combustion liner and for combustion, as well as for any of a variety of downstream processes (e.g., enhanced oil recovery, $CO_2$ injection into a well, etc.). Such recirculation techniques may reduce emissions of nitrous oxides and carbon monoxide from the engine. Furthermore, the disclosed embodiments may advantageously provide components configured to separate the various fluids (e.g., combustion fluids and recirculating fluids) from one another within the engine and to efficiently direct the various fluids to appropriate locations.

Turning now to the drawings, FIG. 1 illustrates a block diagram of an embodiment of a gas turbine system 10. The system 10 may include a stoichiometric exhaust gas recirculation gas turbine engine, as discussed below. As shown, the system 10 includes a primary compressor 12, a turbine combustor 14 (e.g., combustor), and a turbine 16. The primary compressor 12 is configured to receive oxidant 18 from an oxidant source 20 and to provide pressurized oxidant 22 to the combustor 14. The oxidant 18 may include air, oxygen, oxygen-enriched air, oxygen-reduced air, or any combination thereof. Any discussion of air, oxygen, or oxidant herein is intended to cover any or all of the oxidants listed above. Additionally, a fuel nozzle 24 is configured to receive a liquid fuel and/or gas fuel 26, such as natural gas or syngas, from a fuel source 28 and to provide the fuel 26 to the combustor 14. Although one combustor 14 and one fuel nozzle 24 are shown for clarity, the system 10 may include multiple combustors (e.g., 2 to 20) 14 and/or each combustor 14 may receive fuel 26 from multiple fuel nozzles 24 (e.g., 2 to 10).

The combustor 14 ignites and combusts the mixture of the pressurized oxidant 22 and the fuel 26 (e.g., a fuel-oxidant mixture), and then passes hot pressurized combustion gases 30 into the turbine 16. Turbine blades are coupled to a shaft 32, which may be coupled to several other components throughout the turbine system 10. As the combustion gases 30 pass through the turbine blades in the turbine 16, the turbine 16 is driven into rotation, which causes the shaft 32 to rotate. Eventually, the combustion gases 30 exit the turbine 16 via an exhaust outlet 34. As shown, the shaft 32 is coupled to a load 40, which is powered via rotation of the shaft 32. For example, the load 40 may be any suitable device that may generate power or work via the rotational output of the system 10, such as an electrical generator.

Compressor blades are included as components of the primary compressor 12. In the illustrated embodiment, the blades within the primary compressor 12 are coupled to the shaft 32, and will rotate as the shaft 32 is driven to rotate by the turbine 16, as described above. The rotation of the blades within the compressor 12 compresses the oxidant 18 from the oxidant source 20 into the pressurized oxidant 22. The pressurized oxidant 22 is then fed into the combustor 14, either directly or via the fuel nozzles 24 of the combustors 14. For example, in some embodiments, the fuel nozzles 24 mix the pressurized oxidant 22 and fuel 26 to produce a suitable fuel-oxidant mixture ratio for combustion (e.g., a combustion that causes the fuel to more completely burn) so as not to waste fuel or cause excess emissions.

In the illustrated embodiment, the system 10 includes a recirculating fluid compressor 42 (e.g., EGR compressor), which may be driven by the shaft 32. As shown, at least some of the combustion gases 30 (e.g., exhaust gas or EGR fluid) flow from the exhaust outlet 34 into the recirculating fluid compressor 42. The recirculating fluid compressor 42 compresses the combustion gases 30 and recirculates at least some of the pressurized combustion gases 44 (e.g., recirculating fluid) toward the combustor 14. As discussed in more detail below, a first flow of the recirculating fluid 44 may be utilized to cool a liner of the combustor 14. A portion of the first flow may be subsequently directed into a combustion chamber of the combustor 14 for combustion, while another portion of the first flow may be directed toward an extraction conduit 46 (e.g., exhaust gas extraction conduit). Additionally, a second flow of the recirculating fluid 44 may not flow along the liner, but rather, may flow between a flow sleeve and a housing of the combustor toward the extraction conduit 46. The recirculating fluid 44 may be used in any of a variety of manners. For example, the recirculating fluid 44 extracted through the extraction conduit 46 may flow to an extraction system 45 (e.g., an exhaust gas extraction system), which may receive the recirculating fluid 44 from the extraction conduit 46, treat the recirculating fluid 44, and then supply or distribute the recirculating fluid 44 to one or more various downstream systems 47 (e.g., an enhanced oil recovery system or a hydrocarbon production system). The downstream systems 47 may utilize the recirculating fluid 44 in chemical reactions, drilling operations, enhanced oil recovery, $CO_2$ injection into a well, carbon sequestration, or any combination thereof.

As noted above, the gas turbine system 10 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of the fuel and oxidant, thereby resulting in substantially stoichiometric combustion. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the combustor 14 may result in products of combustion or exhaust gas (e.g., 42) with substantially no unburnt fuel or oxidant remaining. For example, the recirculating fluid 44 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the recirculating fluid 44 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. The low oxygen content of the recirculating fluid 44 may be achieved in any of a variety of manners. For example, in some cases, a stoichiometric mixture or approximately stoichiometric mixture of combustion fluids burn to generate combustion gases 30 having the low oxygen content. Additionally or alternatively, in some embodiments, various filtering or processing steps (e.g., oxidation catalysts or the like) may be implemented between the exhaust outlet 34 and/or the recirculating fluid compressor 42, or at any other suitable location within the system 10, to generate the low oxygen recirculating fluid 44. As noted above, the pressurized, low oxygen recirculating fluid 44 may be used for cooling a liner of the combustor 14, may be provided to the combustor for combustion, and/or may be extracted from the combustor for use in various chemical reactions, drilling operations, enhanced oil recovery (EOR), carbon sequestration, $CO_2$ injection into a well, and so forth.

Figure 2:
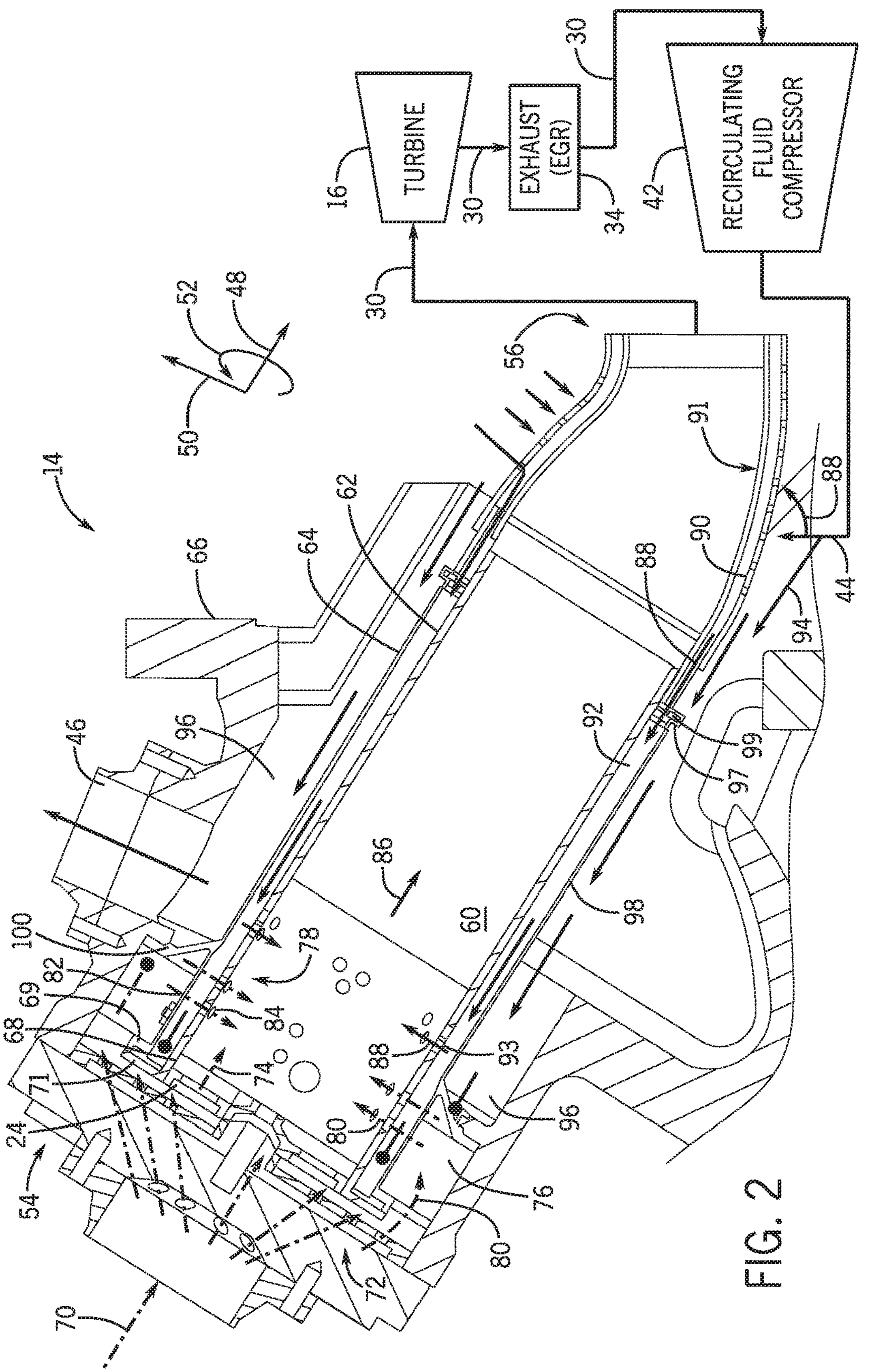
FIG. 2 is a cross-sectional side view schematic of an embodiment of the turbine combustor of FIG. 1.

FIG. 2 is a cross-sectional side view schematic of an embodiment of the combustor 14 of FIG. 1. The combustor 14 may be described herein with reference to an axial axis or direction 48, a radial axis or direction 50, and a circumferential axis or direction 52. The combustor 14 extends from an upstream end 54 to a downstream end 56. As shown, the combustor 14 includes a combustion chamber 60 defined by a liner 62. The combustor 14 also includes a flow sleeve 64 disposed circumferentially about at least a portion of the liner 62. The combustion chamber 60, the liner 62, and the flow sleeve 64 are disposed within a combustor housing 66 (e.g., case).

A cap 68 is positioned at a forward end 69 of the flow sleeve 64. In some embodiments, the cap 68 may be coupled to the forward end 69 of the flow sleeve 64 to form a seal 71 via any suitable technique (e.g., bolted, welded, or the like). A combustion fluid 70 (e.g., the fuel 26, the pressurized oxidant 22, and/or a mixture thereof) is directed into a head end 72 of the combustor 14 and into the combustion chamber 60. For example, in the illustrated embodiment, one or more fuel nozzles 24 disposed within the head end 72 of the combustor 14 provide a first flow 74 of the combustion fluid 70 into the combustion chamber 60. Additionally, a second flow 80 of the combustion fluid 70 flows into a first generally annular volume 76 between a forward portion 78 of the flow sleeve 64 and the case 66, and then subsequently flows radially into the combustion chamber 60 via one or more first openings 82 (e.g., conduits or holes) in the flow sleeve 64 and one or more second openings 84 (e.g., conduits or holes) in the liner 62. As shown, the second flow 80 of the combustion fluid 70 may enter the combustion chamber 60 downstream of the first flow 74 of the combustion fluid 70 in a direction that is generally transverse (e.g., a radial direction) to a flow direction 86 within the combustor 14.

The combustor 14 ignites and combusts the combustion fluid 70 in the combustion chamber 60 and passes the hot pressurized combustion gases 30 into the turbine 16. The combustion gases 30 are passed through the exhaust outlet 34, and at least some of the combustion gases 30 are directed into the recirculating fluid compressor 42. In the illustrated embodiment, the recirculating fluid compressor 42 compresses the combustion gases 30 and directs the compressed combustion gases 44 (e.g., recirculating fluid or EGR fluid) toward the combustor 14. As shown, a first flow 88 of the recirculating fluid 44 passes through an impingement sleeve 90 (e.g., a perforated sleeve) of a transition piece 91 of the combustor 14 and into a second generally annular volume 92 between the liner 62 and the flow sleeve 64. The first flow 88 of the recirculating fluid 44 may cool the liner 62 as the first flow 88 flows lengthwise along the liner 62 toward the upstream end 54 of the combustor 14. The first flow 88 may then flow radially into the combustion chamber 60 via one or more openings 93 in the liner 62, where the first flow 88 is mixed with the combustion fluid 70.

A second flow 94 of the recirculating fluid 44 does not pass through the impingement sleeve 90, but rather, is directed toward the fluid extraction conduit 46. In the illustrated embodiment, the second flow 94 of the recirculating fluid 44 flows into a third generally annular volume 96 between the flow sleeve 64 and the case 66. As shown, the third generally annular volume 96 extends around at least a portion of the second generally annular volume 92 (e.g., the second generally annular volume 92 and the third generally annular volume 96 may extend about an axis of the combustor and/or are coaxial). As used herein, the terms annular, generally annular, or generally annular volume may refer to an annular or non-annular volume having various arcuate surfaces and/or flat surfaces. The second flow 94 flows generally toward the upstream end 54 of the combustor 14 within the third generally annular volume 96 and eventually flows into the extraction conduit 46. An aft end 97 of the flow sleeve 64 is coupled to the impingement sleeve 90 via a ring 99, and an aft portion 98 of the flow sleeve 64 separates the second generally annular volume 92 from the third generally annular volume 96. Thus, once the first flow 88 of the recirculating fluid 44 passes through the impingement sleeve 90 and into the second generally annular volume 92, the first flow 88 and the second flow 94 of the recirculating fluid 44 are separated (e.g., isolated) from one another. Additionally, as discussed below, the second flow 94 of the recirculating fluid 44 within the combustor 14 is separated (e.g., isolated) from the combustion fluid 70.

The impingement sleeve 90 may be configured to enable a particular volume or percentage of the recirculating fluid 44 into the second generally annular volume 92. Thus, the first flow 88 of the recirculating fluid 44 may be any suitable fraction of the recirculating fluid 44 output by the recirculating fluid compressor 42. For example, approximately 50 percent of the recirculating fluid 44 may flow into the second generally annular volume 92, while approximately 50 percent of the recirculating fluid 44 may flow into the third generally annular volume 96. In other embodiments, approximately 10, 20, 30, 40, 60, 70, 80, 90 percent or more of the recirculating fluid 44 output by the recirculating fluid compressor 42 may flow through the impingement sleeve 90 and into the second generally annular volume 92. In some embodiments, approximately 10-75 percent, 20-60 percent, or 30-50 percent of the recirculating fluid 44 output by the recirculating fluid compressor 42 may flow through the impingement sleeve 90 and into the second generally annular volume 92.

In the illustrated embodiment, the fluid extraction conduit 46 is positioned axially between the impingement sleeve 90 and the upstream end 54 of the combustor 14 (e.g., upstream from the impingement sleeve 90 and downstream of the head end 72), although the fluid extraction conduit 46 may be disposed in any suitable position for directing the recirculating fluid 44 away from the recirculating fluid compressor 42 and/or from the combustor 14. In certain embodiments, it may be desirable for the second flow 94 of the recirculating fluid 44 to maintain a relatively high pressure as the second flow 94 flows toward the extraction conduit 46. Thus, the third generally annular volume 96 may have a relatively large cross-sectional area (e.g., a flow area) configured to maintain the relatively high pressure of the second flow 94. As space within the combustor 14, and particularly space between the liner 62 and the case 66 may be limited, the flow area of the third generally annular volume 96 may be greater than a flow area of the second generally annular volume 92 along a length of the third generally annular volume 96 to facilitate maintenance of the high pressure of the second flow 94. For example, the flow area of the third generally annular volume 96 may be approximately 10, 20, 30, 40, 50, 60 and/or more percent larger than the flow area of the second generally annular volume 92 along the length of the second generally annular volume 92. Such a configuration may enable a compact design of the combustor 14 and efficient fluid flow, while also maintaining a relatively high pressure of the second flow 94 of the recirculating fluid 44 as this fluid travels toward the extraction conduit 46.

Additionally, in the illustrated embodiment, a flange 100 extends between the flow sleeve 64 and the case 66. The flange 100 is configured to separate the second flow 94 of the recirculating fluid 44 in the third generally annular volume 96 from the combustion fluid 70 in the first generally annular volume 76. The flange 100 may have any suitable form for separating these fluids. As shown, the flange 100 extends radially outward from and circumferentially about the flow sleeve 64 (e.g., the flange 100 is annular). The flange 100 may be integrally formed with the flow sleeve 64 from a single piece of material, or the flange 100 may be welded to the flow sleeve 64. In other embodiments, the flange 100 may be coupled to the flow sleeve 64 via any suitable fasteners (e.g., a plurality of threaded fasteners, such as bolts). The flange 100 may also be coupled to the case 66 via any suitable technique. The flange 100 may be integrally formed with the case 66 from a single piece of material, or the flange 100 may be welded to the case 66. In other embodiments, the flange 100 may be coupled to the case 66 via any suitable fasteners (e.g., a plurality of threaded fasteners, such as bolts). The flange 100 blocks the flow of the combustion fluid 70 and the second flow 94 of the recirculating fluid 44 across the flange 100. Additionally, the seal 71 between the cap 68 and the forward end 69 of the flow sleeve 64 blocks the first flow 88 of the recirculating fluid 44 from entering the head end 72 of the combustor 14. Thus, the cap 68, the seal 71, the forward portion 78 of the flow sleeve 64, and the flange 100 generally separate the combustion fluid 70 and the recirculating fluid 44 from one another. Furthermore, the first flow 88 of the recirculating fluid 44 is at a higher pressure than the combustion fluid 70 flowing from the first annular space 76 into the combustion chamber 60, and this pressure differential blocks the combustion fluid 70 from flowing downstream into the second generally annular volume 92.

Figure 3:
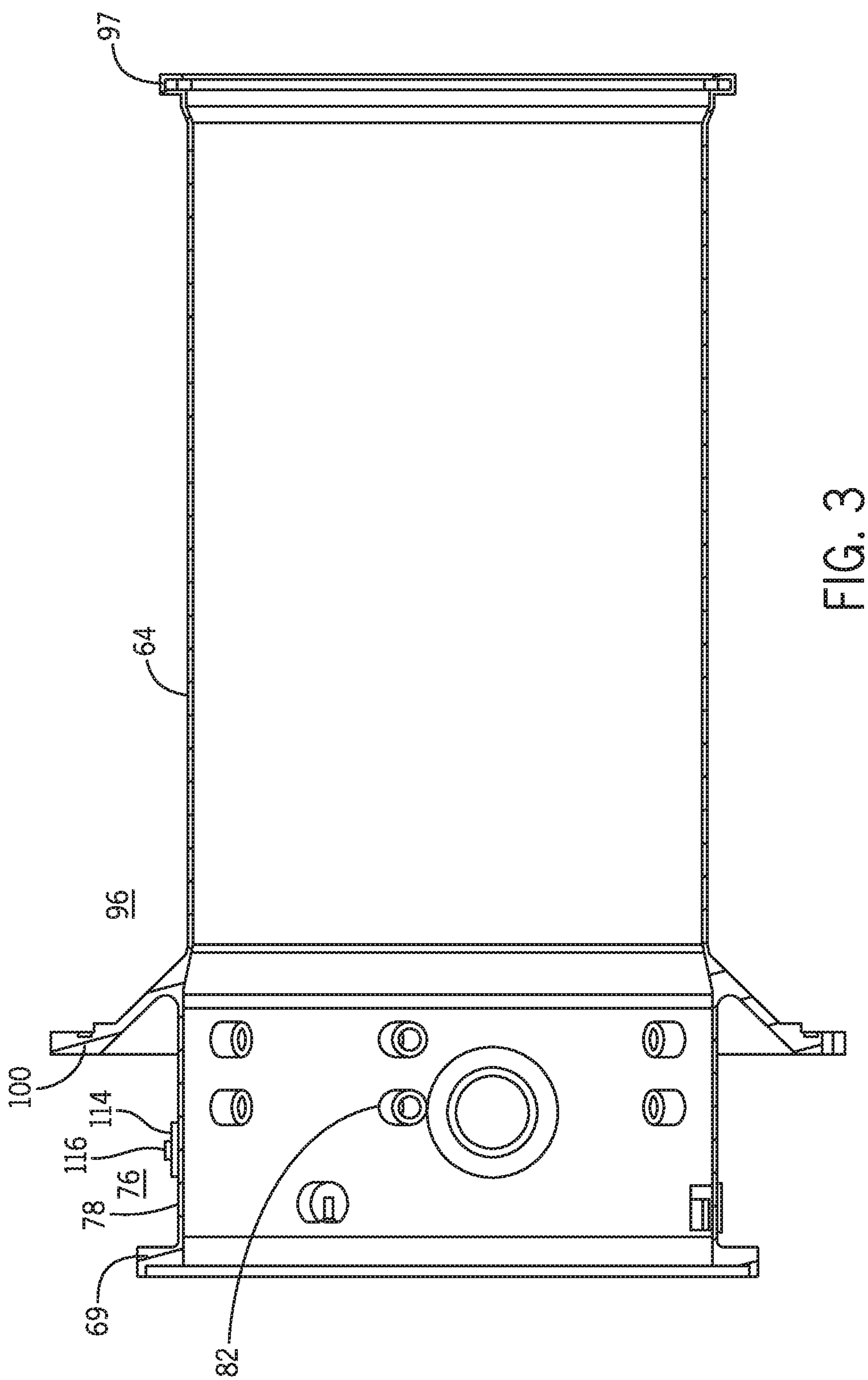
FIG. 3 is a cross-sectional side view schematic of an embodiment of a flow sleeve of the turbine combustor of FIG. 2.
Figure 4:
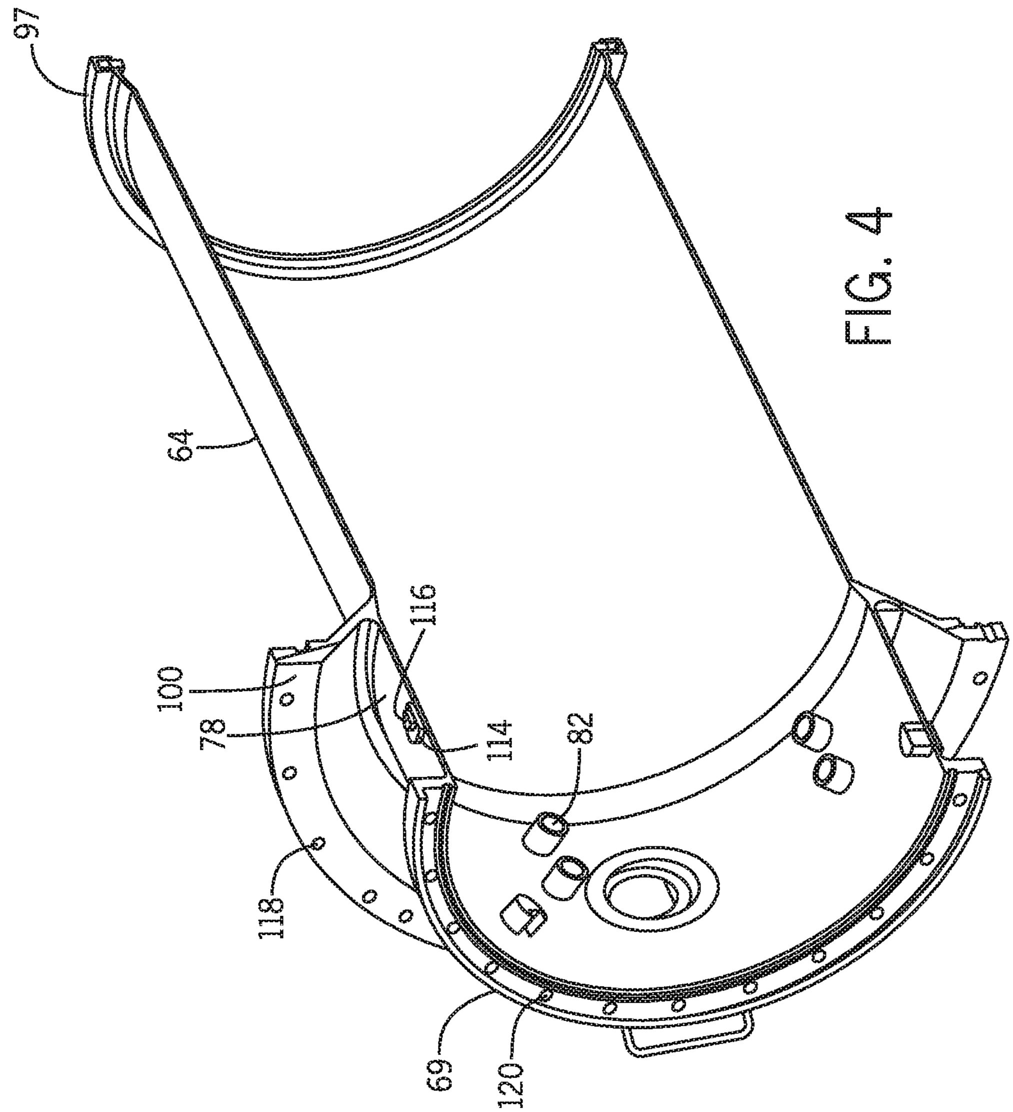
FIG. 4 is a cutaway perspective view of an embodiment of a flow sleeve of the turbine combustor of FIG. 2.

FIG. 3 is a cross-sectional side view schematic of the flow sleeve 64 of the combustor 14, and FIG. 4 is a cutaway perspective view of the flow sleeve 64 of the combustor 14, in accordance with an embodiment. The flow sleeve 64 extends between the forward end 69 and the aft end 97. The forward end 69 of the flow sleeve 64 is configured to be coupled to the cap 68 to form the seal 71, while the aft end 97 of the flow sleeve 64 is configured to be coupled to the impingement sleeve 90 via the ring 99, as shown in FIG. 2. The flange 100 extends radially outward from and extends circumferentially about the flow sleeve 64. As discussed above, the flange 100 is configured to extend between the flow sleeve 64 and the case 66, thereby separating the first generally annular volume 76 that is configured to receive the combustion fluid 70 from the third generally annular volume 96 that is configured to receive the second flow 94 of the recirculating fluid 44, as shown in FIG. 2. The forward portion 78 of the flow sleeve 64 includes the openings 82 to enable the combustion fluid 70 to flow radially inward from the first generally annular volume 76 toward the combustion chamber 60. Additionally, in the illustrated embodiments, one or more bosses 114 are provided in the forward portion 78 of the flow sleeve 64. The one or more bosses 114 may enable placement of hardware through the flow sleeve 64 and into the combustion chamber 60. As shown, the one or more bosses 114 may include floating collars 116 to block fluid flow through the one or more bosses 114. Furthermore, as shown in FIG. 4, the flange 100 may have apertures 118 that are configured to receive suitable fasteners (e.g., a plurality of threaded fasteners, such as bolts) to couple the flange 100 to the case 66. In some embodiments, the forward end 69 of the flow sleeve 64 may include apertures 120 that are configured to receive suitable fasteners (e.g., a plurality of threaded fasteners, such as bolts) to couple the flow sleeve 64 to the cap 68.

Technical effects of the disclosed embodiments include systems for controlling the flow of the combustion fluid 70 and the recirculating fluid 44 within the engine 10. The disclosed embodiments recirculate combustion gases 30, which may be used to cool the combustor liner 62 and/or may be extracted for other purposes, for example. The first flow 88 of the recirculating fluid 44 may flow along the liner 62, thereby cooling the liner 62, while the second flow 94 of the recirculating fluid 44 may be extracted from the combustor 14. The first flow 88 and the second flow 94 of the recirculating fluid 44 may be separated from one another via the flow sleeve 64. Additionally, the recirculating fluid 44 may be separated from the combustion fluid 70 via the cap 68, the forward portion 78 of the flow sleeve 64, the flange

100, and/or the pressure differential between the first flow 88 of recirculating fluid 44 and the combustion fluid 70. The disclosed embodiments may advantageously reduce emissions via recirculating the combustion gases 30. Additionally, the disclosed embodiments may provide a compact system for efficiently separating and directing various fluids within the combustor 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

ADDITIONAL DESCRIPTION

The present embodiments provide a system and method for gas turbine engines. It should be noted that any one or a combination of the features described above may be utilized in any suitable combination. Indeed, all permutations of such combinations are presently contemplated. By way of example, the following clauses are offered as further description of the present disclosure:

Embodiment 1

A system, comprising: a turbine combustor, comprising: a first volume configured to receive a combustion fluid and to direct the combustion fluid into a combustion chamber; and a second volume configured to receive a first flow of an exhaust gas and to direct the first flow of the exhaust gas into the combustion chamber; and a third volume disposed axially downstream from the first volume and circumferentially about at least a portion of the second volume, wherein the third volume is configured to receive a second flow of the exhaust gas and to direct the second flow of the exhaust gas out of the turbine combustor via an extraction outlet, and the third volume is isolated from each of the first volume and from the second volume.

Embodiment 2

The system of embodiment 1, comprising: a housing; a flow sleeve disposed within the housing, wherein the third volume is defined between an aft portion of the flow sleeve and the housing; and a flange extending radially outward from the flow sleeve to the housing, wherein the flange isolates the third volume from the first volume.

Embodiment 3

The system defined in any preceding embodiment, wherein the extraction outlet is positioned between a transition piece and a head end of the combustor.

Embodiment 4

The system defined in any preceding embodiment, comprising: a housing, a liner disposed within the housing; a flow sleeve disposed within the housing and radially outward of the liner, wherein the second volume is defined between the liner and the flow sleeve, the third volume is defined between the flow sleeve and the housing, and an aft portion of the flow sleeve isolates the first volume from the second volume.

Embodiment 5

The system defined in any preceding embodiment, comprising an exhaust gas compressor configured to compress and to route the exhaust gas to the turbine combustor.

Embodiment 6

The system defined in any preceding embodiment, comprising a gas turbine engine having the turbine combustor, wherein the gas turbine engine is a stoichiometric exhaust gas recirculation gas turbine engine.

Embodiment 7

The system defined in any preceding embodiment, comprising an exhaust gas extraction system coupled to the extraction conduit, and a hydrocarbon production system coupled to the exhaust gas extraction system.

Embodiment 8

The system defined in any preceding embodiment, wherein the first volume is disposed within a head end of the turbine combustor.

Embodiment 9

The system defined in any preceding embodiment, comprising: a liner defining a combustion chamber of the turbine combustor; a flow sleeve disposed radially outward of the liner; and a cap positioned proximate to the head end of the turbine combustor and coupled to a forward end of the flow sleeve to form a seal; wherein the second volume is defined between the liner and flow sleeve, and the seal is configured to block the first flow of the second fluid from flowing into the head end of the turbine combustor.

Embodiment 10

The system defined in any preceding embodiment, wherein a forward portion of the flow sleeve comprises one or more openings configured to enable the first fluid to flow radially inward through the flow sleeve and toward the combustion chamber.

Embodiment 11

The system defined in any preceding embodiment, wherein a first cross-sectional flow area of the second volume is less than a second cross-sectional flow area of the third volume.

Embodiment 12

A system, comprising: a turbine combustor, comprising: a housing; a liner defining a combustion chamber; a flow sleeve disposed about the liner; a first volume disposed in a head end of the combustion chamber, wherein the first volume is configured to receive a combustion fluid and to provide the combustion fluid to the combustion chamber; a second volume disposed downstream of the first volume and defined between the flow sleeve and the housing, wherein the second volume is configured to receive a first flow of recirculated combustion products and to direct the first flow of recirculated combustion products out of the combustor via an extraction conduit; and a flange extending between the flow sleeve and the housing, wherein the flange is configured to block flow of the combustion fluid into the second volume and to block flow of the first flow of recirculated combustion products into the first volume.

Embodiment 13

The system defined in any preceding embodiment, comprising a third volume defined between the liner and the flow sleeve, wherein the third volume is configured to receive a second flow of recirculated combustion products and to direct the second flow of recirculated combustion products into the combustion chamber, and the flow sleeve isolates the second volume from the third volume.

Embodiment 14

The system defined in any preceding embodiment, comprising a transition piece having an impingement sleeve, wherein the impingement sleeve enables the second flow of recirculated combustion products to flow into the third volume.

Embodiment 15

The system defined in any preceding embodiment, wherein the extraction conduit is positioned between a transition piece and a head end of the turbine combustor.

Embodiment 16

The system defined in any preceding embodiment, comprising an exhaust gas compressor configured to compress and to route the recirculated combustion products to the turbine combustor.

Embodiment 17

The system defined in any preceding embodiment, comprising an exhaust gas extraction system coupled to the extraction conduit, and a hydrocarbon production system coupled to the exhaust gas extraction system.

Embodiment 18

The system defined in any preceding embodiment, comprising a gas turbine engine having the turbine combustor, wherein the gas turbine engine is a stoichiometric exhaust gas recirculation gas turbine engine.

Embodiment 19

A method, comprising: combusting an oxidant and a fuel in a combustion chamber of a turbine combustor to generate combustion products; compressing at least some of the combustion products generated by the combustor to generate compressed combustion products; cooling a liner of the turbine combustor using a first flow of the compressed combustion products; and isolating a second flow of the compressed combustion products within the turbine combustor from the oxidant, the fuel, and the first flow of the compressed combustion products.

Embodiment 20

The method or system defined in any preceding embodiment, wherein combusting the oxidant and the fuel comprises operating the turbine combustor in a stoichiometric combustion mode of operation.

Embodiment 21

The method or system defined in any preceding embodiment, comprising directing the first flow of the compressed combustion products into the combustion chamber.

Embodiment 22

The method or system defined in any preceding embodiment, comprising extracting the second flow of the compressed combustion products out of the turbine combustor.

Embodiment 23

The method or system defined in any preceding embodiment, wherein extracting the second flow of the compressed combustion products out of the combustor occurs between a transition piece and a head end of the turbine combustor.

Embodiment 24

The method or system defined in any preceding embodiment, wherein the first flow of the compressed combustion products comprises approximately 50 percent of the compressed combustion products output by the compressor.

Embodiment 25

The method or system defined in any preceding embodiment, wherein the compressed combustion products output by the compressor comprise less than 5 percent by volume of oxygen.

The invention claimed is:

1. A system, comprising:

a turbine combustor, comprising:

- a liner defining a combustion chamber;
- a flow sleeve disposed radially outward of the liner comprising a forward portion and an aft portion;
- a first volume configured to receive a combustion fluid and to direct the combustion fluid into the combustion chamber, wherein at least a portion of the first volume is disposed radially outward of the forward portion of the flow sleeve, wherein the first volume is disposed within a head end of the turbine combustor;
- a cap positioned proximate to the head end of the turbine combustor and coupled to a forward end of the flow sleeve to form a seal;
- a second volume disposed at least partially between the flow sleeve and the liner, wherein the second volume is configured to receive a first flow of an exhaust gas and to direct the first flow of the exhaust gas into the combustion chamber, wherein the seal is configured to block the first flow of the exhaust gas from flowing into the head end of the turbine combustor; and
- a third volume disposed axially downstream from the first volume and circumferentially about at least a portion of the second volume, wherein the third volume is configured to receive a second flow of the exhaust gas and to direct the second flow of the exhaust gas out of the turbine combustor via an extraction conduit, the third volume is isolated from each of the first volume and from the second volume, and the aft portion of the flow sleeve isolates the second volume from the third volume;

wherein the forward portion of the flow sleeve comprises one or more first openings configured to enable the combustion fluid to flow radially inward through the flow sleeve, the liner comprises one or more second openings into the combustion chamber, and the first volume is configured to direct the combustion fluid through the one or more first openings of the flow sleeve, through the one or more second openings of the liner, and into the combustion chamber.

2. The system of claim 1, comprising:

a housing, wherein the flow sleeve is disposed within the housing, and the third volume is defined between the aft portion of the flow sleeve and the housing; and a flange extending radially outward from the forward portion of the flow sleeve to the housing, wherein the flange isolates the third volume from the first volume.

3. The system of claim 1, wherein the extraction conduit is positioned between a transition piece and a head end of the turbine combustor.

4. The system of claim 1, comprising:

a housing, wherein the liner is disposed within the housing and the flow sleeve is disposed within the housing, wherein the second volume is defined between the liner and the flow sleeve, and the third volume is defined between the flow sleeve and the housing.

5. The system of claim 1, comprising an exhaust gas compressor configured to compress and to route the exhaust gas to the turbine combustor.

6. The system of claim 1, comprising a gas turbine engine having the turbine combustor, wherein the gas turbine engine is a stoichiometric exhaust gas recirculation gas turbine engine.

7. The system of claim 1, comprising an exhaust gas extraction system coupled to the extraction conduit, and a hydrocarbon production system coupled to the exhaust gas extraction system.

8. The system of claim 1, wherein a first cross-sectional flow area of the second volume is less than a second cross-sectional flow area of the third volume.

9. A system, comprising:

a turbine combustor, comprising:

a housing;

a liner defining a combustion chamber;

a flow sleeve disposed about the liner;

a first volume disposed in a head end of the combustion chamber, wherein the first volume is configured to receive a combustion fluid and to provide the combustion fluid to the combustion chamber;

a third volume disposed downstream of the first volume and defined between the flow sleeve and the housing, wherein the third volume is configured to receive a second flow of recirculated combustion products and to direct the second flow of recirculated combustion products out of the turbine combustor via an extraction conduit; and a flange extending between the flow sleeve and the housing, wherein the flange is configured to block flow of the combustion fluid into the third volume and to block flow of the second flow of recirculated combustion products into the first volume.

10. The system of claim 9, comprising a second volume defined between the liner and the flow sleeve, wherein the second volume is configured to receive a first flow of recirculated combustion products and to direct the first flow of recirculated combustion products into the combustion chamber, and the flow sleeve isolates the second volume from the third volume.

11. The system of claim 10, comprising a transition piece having an impingement sleeve, wherein the impingement sleeve enables the first flow of recirculated combustion products to flow into the second volume.

12. The system of claim 9, wherein the extraction conduit is positioned between a transition piece and the head end of the turbine combustor.

13. The system of claim 9, comprising an exhaust gas compressor configured to compress and to route the second flow of recirculated combustion products to the turbine combustor.

14. The system of claim 9, comprising an exhaust gas extraction system coupled to the extraction conduit, and a hydrocarbon production system coupled to the exhaust gas extraction system.

15. The system of claim 9, comprising a gas turbine engine having the turbine combustor, wherein the gas turbine engine is a stoichiometric exhaust gas recirculation gas turbine engine.

16. A method, comprising:

combusting an oxidant and a fuel in a combustion chamber of a turbine combustor to generate combustion products;

compressing, via a recirculating fluid compressor, at least some of the combustion products generated by the turbine combustor to generate compressed combustion products;

cooling a liner of the turbine combustor using a first flow of the compressed combustion products through a second volume disposed at least partially around the combustion chamber;

separating a second flow of the compressed combustion products within the turbine combustor from the oxidant, the fuel, and the first flow of the compressed combustion products, wherein the second flow of the compressed combustion products are separated from the first flow of the compressed combustion products by a flow sleeve that extends circumferentially about the liner, wherein the second volume is at least partially disposed between the flow sleeve and the liner;

separating the second flow of the compressed combustion products from a first volume via a flange, wherein the first volume is configured to receive the oxidant, the fuel, or both; and routing at least some of the oxidant, the fuel, or both, into the combustion chamber in a radial direction from the first volume upstream of the turbine combustor and across the second volume via one or more first combustion fluid openings in the flow sleeve and one or more second combustion fluid openings in the liner, wherein the one or more first combustion fluid openings and the one or more second combustion fluid openings are disposed upstream of the flange.

17. The method of claim 16, wherein combusting the oxidant and the fuel comprises operating the turbine combustor in a stoichiometric combustion mode of operation.

18. The method of claim 16, comprising directing the first flow of the compressed combustion products into the combustion chamber.

19. The method of claim 16, comprising extracting the second flow of the compressed combustion products out of the turbine combustor.

20. The method of claim 19, wherein extracting the second flow of the compressed combustion products out of the turbine combustor occurs between a transition piece and a head end of the turbine combustor.

21. The method of claim 16, wherein the first flow of the compressed combustion products comprises approximately 50 percent of the compressed combustion products output by the recirculating fluid compressor.

22. The method of claim 16, wherein the compressed combustion products output by the recirculating fluid compressor comprise less than 5 percent by volume of oxygen.

* * * * *